US012558641B2

(12) United States Patent
Yoshioka et al.

(10) Patent No.: US 12,558,641 B2
(45) Date of Patent: Feb. 24, 2026

(54) HONEYCOMB FILTER

(71) Applicant: NGK Insulators, Ltd., Nagoya (JP)

(72) Inventors: Fumihiko Yoshioka, Novi, MI (US);
Yudai Kurimoto, Shanghai (CN)

(73) Assignee: NGK INSULATORS, LTD., Nagoya
(JP)

( * ) Notice: Subject to any disclaimer, the term of this
patent is extended or adjusted under 35
U.S.C. 154(b) by 0 days.

(21) Appl. No.: 18/173,938

(22) Filed: Feb. 24, 2023

(65) Prior Publication Data

US 2023/0347274 A1     Nov. 2, 2023

(30) Foreign Application Priority Data

Mar. 29, 2022     (JP) ................................. 2022-053821

(51) Int. Cl.
B01D 46/24 (2006.01)
(52) U.S. Cl.
CPC ..... B01D 46/2429 (2013.01); B01D 46/2444
(2013.01); B01D 46/24491 (2021.08); B01D
46/24494 (2021.08); B01D 46/2482 (2021.08);
B01D 46/2484 (2021.08); B01D 2257/404
(2013.01)
(58) Field of Classification Search
CPC .......... B01D 46/2429; B01D 46/24491; B01D
46/24494; B01D 46/2484; B01D 46/2482;
B01D 46/2444; B01D 2257/404; B01D
46/24
USPC .......................................................... 55/529
See application file for complete search history.

(56) References Cited

U.S. PATENT DOCUMENTS

2008/0220203 A1*  9/2008  Ichikawa ........... B01D 46/0036
428/116
2015/0252702 A1   9/2015  Ito
2020/0094183 A1*  3/2020  Houra .............. B01D 46/24491

FOREIGN PATENT DOCUMENTS

JP     2015-166296 A     9/2015
JP     2018094506 A  *  6/2018
JP     2020-045264 A     3/2020

OTHER PUBLICATIONS

George Schuetz, Surface Texture Form Ra to Rz (Year: 2002).*

* cited by examiner

*Primary Examiner* — Jennifer Dieterle
*Assistant Examiner* — Qianping He
(74) *Attorney, Agent, or Firm* — BURR PATENT LAW,
PLLC

(57)     ABSTRACT

A honeycomb filter includes: a honeycomb substrate having
porous partition walls disposed so as to surround cells
extending from an inflow end face to an outflow end face, an
outer peripheral coating layer disposed so as to surround an
outer periphery of the honeycomb substrate, and plugging
portions that are disposed at any one of ends on the inflow
end face and ends on the outflow end face, of the cells,
wherein, the outer peripheral coating layer has an inflection
point at which thermal expansion in thermal expansion
behavior of the outer peripheral coating layer turns to
contraction and a temperature T1 of which is 1000 to 1500°
C., and the outer peripheral coating layer has a porosity P1
of 36 to 48%, and a thermal expansion coefficient C1
between 40 to 800° C. of 2.5 to $3.5 \times 10^{-6}$/° C.

6 Claims, 3 Drawing Sheets

HONEYCOMB FILTER

RELATED APPLICATIONS

The present application is an application based on JP 2022-053821 filed on Mar. 29, 2022 with Japan Patent Office, the entire contents of which are incorporated herein by reference.

BACKGROUND OF THE INVENTION

Field of the Invention

The present invention relates to a honeycomb filter. More specifically, the present invention relates to a honeycomb filter having excellent thermal shock resistance.

Description of the Related Art

Conventionally, a honeycomb filter using honeycomb structure has been known as a filter for trapping a particulate matter in exhaust gas discharged from an internal combustion engine such as a diesel engine or a device for purifying toxic gaseous components such as CO, HC and NOx. A honeycomb structure includes partition walls made of porous ceramics, such as cordierite or silicon carbide, and the partition walls define a plurality of cells. A honeycomb filter is formed by providing such a honeycomb structure with plugging portions so as to plug open ends on an inflow end face thereof and an outflow end face thereof, of the plurality of cells alternately. In other words, a honeycomb filter has inflow cells that are open on the inflow end face and are plugged on the outflow end face and outflow cells that are plugged on the inflow end face and are open on the outflow end face, and these inflow cells and outflow cells are disposed alternately via the partition walls. In the honeycomb filter, the porous partition walls of honeycomb structure serve as a filter for trapping particulate matter in exhaust gas. Hereinafter, particulate matter included in exhaust gas may be referred to as "PM". "PM" is an abbreviation for "particulate matter."

On the other hand, when manufacturing a honeycomb structure corresponding to various industrial technical fields, a large honeycomb structure having an outer diameter larger than usual (that is, a diameter of a cross section perpendicular to the axial direction) may be required. When such a large honeycomb structure is to be integrally formed by extrusion, for example, the shape of the partition walls at the outer peripheral portion may not be stable, and the product shape and dimensional accuracy of honeycomb structure may be deteriorated.

Therefore, a technique has been proposed in which an outer peripheral surface of a honeycomb structure is ground with grinding wheel or the like, and an outer diameter thereof is adjusted to be constant, and then an outer peripheral coating layer (circumferential wall) is again provided on an outer peripheral surface of the ground-processed honeycomb structure (hereinafter, also referred to as "honeycomb substrate") (see, for example, Patent Documents 1 and 2). According to such a technique, it is possible to enhance the product shape and dimensional accuracy by the outer peripheral coating layer.

[Patent Document 1] JP 2015-166296 JP
[Patent Document 2] JP 2020-45264 JP

However, the honeycomb filter provided with the outer peripheral coating layer on the outer peripheral surface of the honeycomb substrate has a large difference in thermal expansion between the honeycomb substrate and the outer peripheral coating layer, and the honeycomb filter may be damaged due to an increase of an exhaust gas temperature.

The present invention has been made in view of the problem in the prior arts described above. The present inventors have intensively studied to realize a honeycomb filter which is excellent in thermal shock resistance by suppressing breakage caused by an increase of an exhaust gas temperature, and have obtained the following findings. The outer peripheral coat layer has, in its thermal expansion behavior, an inflection point at which expansion turns to contraction at a certain temperature, and thus the outer peripheral coat layer exhibits contraction behavior when the exhaust gas temperature exceeds the temperature of the inflection point. On the other hand, the honeycomb substrate still exhibits expansion behavior even when the temperature of the inflection point is exceeded, and the difference of expansion and contraction between the honeycomb substrate and the outer peripheral coating layer generates high stress which damages the honeycomb filter. According to the present invention, it is possible to provide a honeycomb filter which is suppressed from being damaged due to the above-described increase of the exhaust gas temperature and is excellent in thermal shock resistance.

SUMMARY OF THE INVENTION

According to the present invention, a honeycomb filter described below is provided.

According to a first aspect of the present invention, a honeycomb filter is provided including:

a honeycomb substrate that is pillar-shaped and has porous partition walls disposed so as to surround a plurality of cells each of which serves as a fluid through channel extending from an inflow end face of the honeycomb substrate to an outflow end face of the honeycomb substrate, an outer peripheral coating layer disposed so as to surround an outer periphery of the honeycomb substrate, and plugging portions that are disposed at any one of ends on the inflow end face and ends on the outflow end face, of the plurality of cells, wherein, the outer peripheral coating layer has an inflection point at which expansion in thermal expansion behavior of the outer peripheral coating layer turns to contraction and a temperature T1 of which is 1000 to 1500° C., and the outer peripheral coating layer has a porosity P1 of 36 to 48%, and a thermal expansion coefficient C1 between 40 to 800° C. of 2.5 to 3.5×10$^{-6}$/° C.

According to a second aspect of the present invention, the honeycomb filter according to the first aspect is provided, wherein a porosity P2 of the honeycomb substrate is 53 to 60%.

According to a third aspect of the present invention, the honeycomb filter according to the first or second aspects is provided, wherein a ratio (P1/P2) between the porosity P1 of the outer peripheral coating layer and the porosity P2 of the honeycomb substrate is 0.6 to 0.9.

According to a fourth aspect of the present invention, the honeycomb filter according to any one of the first to third aspects is provided, wherein a surface roughness Ra of the outer peripheral coating layer is 10 to 25 μm.

According to a fifth aspect of the present invention, the honeycomb filter according to any one of the first to fourth aspects is provided, wherein a thickness L1 of the outer peripheral coating layer is 1 to 3 mm.

According to a sixth aspect of the present invention, the honeycomb filter according to any one of the first to fifth aspects is provided, wherein a thickness L2 of the partition walls is 0.17 to 0.32 mm, and a cell density of the honeycomb substrate is 30 to 63 cells/cm$^2$.

According to a seventh aspect of the present invention, the honeycomb filter according to any one of the first to sixth aspects is provided, wherein a thermal expansion coefficient C2 between 4° and 800° C. of the honeycomb substrate is 0.2 to $1.5 \times 10^{-6}$/° C.

According to an eighth aspect of the present invention, the honeycomb filter according to the seventh aspect is provided, wherein a ratio (C1/C2) between the thermal expansion coefficient C1 of the outer peripheral coating layer and the thermal expansion coefficient C2 of the honeycomb substrate is 3 to 12.

The honeycomb filter according to the present invention is excellent in thermal shock resistance by suppressing damage caused by an increase of an exhaust gas temperature. That is, in the honeycomb filter of the present invention, even if the exhaust gas temperature rises, the outer peripheral coat layer hardly contracts, and the difference of expansion and contraction between the honeycomb substrate and the outer peripheral coat layer is small, so that the generation of the stress at high temperatures can be effectively suppressed. Accordingly, the honeycomb filter of the present invention is excellent in thermal shock resistance.

Further, since the honeycomb filter of the present invention is excellent in thermal shock resistance as described above, porosity of the outer peripheral coating layer can be increased, and the heat capacity of the entire honeycomb filter can be lowered. Therefore, when a catalyst is loaded in the honeycomb filter, a temperature rise rate of the catalyst is improved, and purification performance is also expected to be improved due to early activation of the catalyst.

BRIEF DESCRIPTION OF THE DRAWINGS

FIG. 3 is a plan view showing the outflow end face of the honeycomb filter shown in FIG. 1.

DESCRIPTION OF THE PREFERRED EMBODIMENTS

The following will describe embodiments of the present invention; however, the present invention is not limited to the following embodiments. Therefore, it should be understood that those created by adding changes, improvements or the like to the following embodiments, as appropriate, on the basis of the common knowledge of one skilled in the art without departing from the spirit of the present invention are also covered by the scope of the present invention.

(1) Honeycomb Filter

Figures 1, 2:
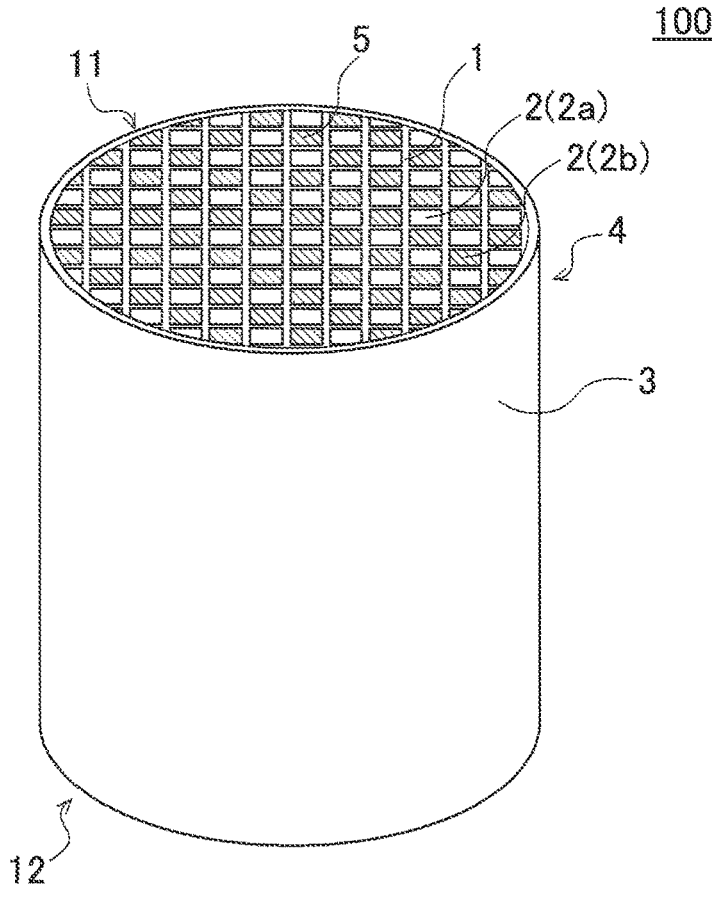
FIG. 1 is a perspective view schematically showing an embodiment of a honeycomb filter according to the present invention.
FIG. 2 is a plan view showing an inflow end face of the honeycomb filter shown in FIG. 1.
Figure 3:
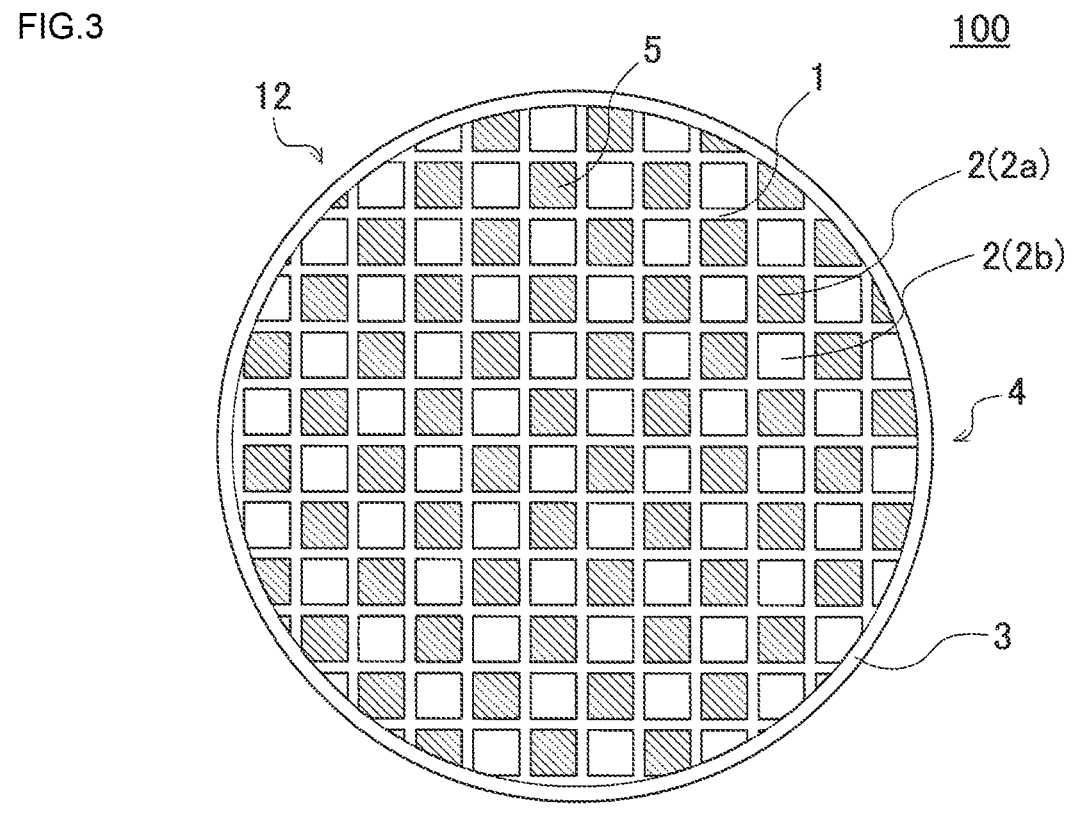
Figure 4:
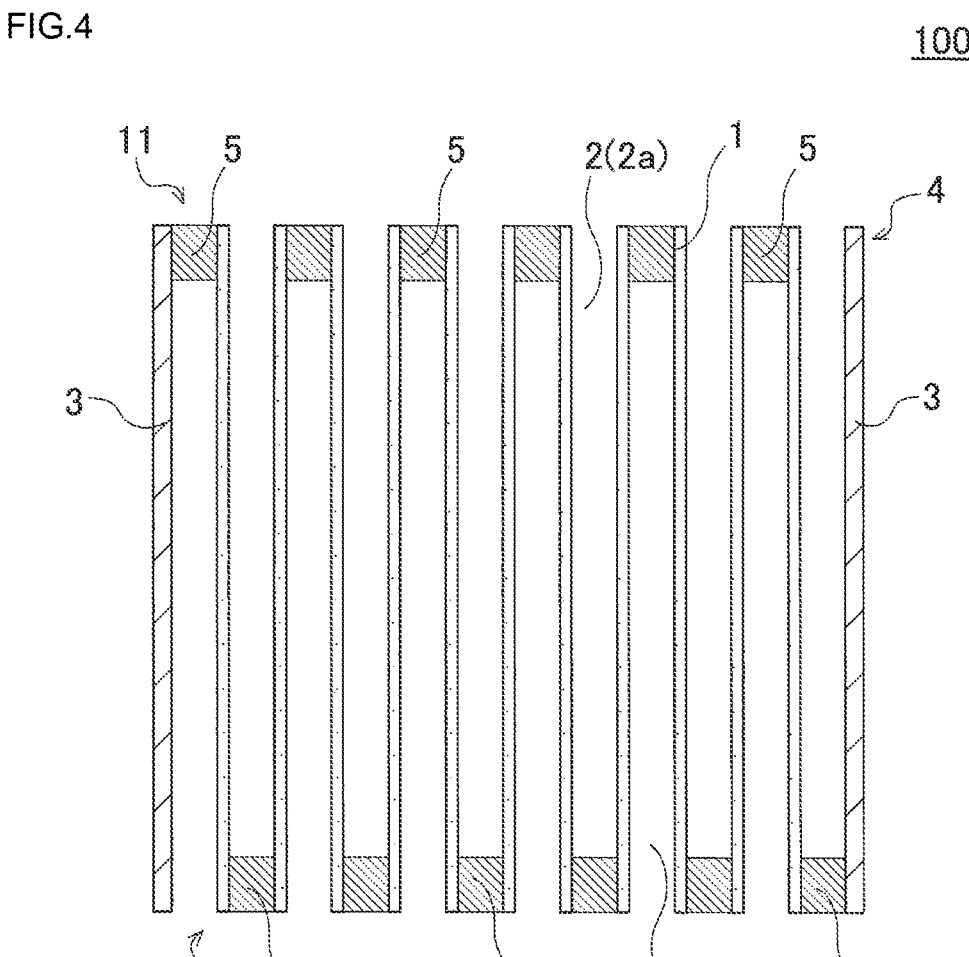
FIG. 4 is a cross-sectional view schematically showing an A-A' cross section of FIG. 2.

An embodiment of the present honeycomb filter is a honeycomb filter 100 as shown in FIGS. 1 to 4. Here, FIG. 1 is a perspective view schematically showing an embodiment of a honeycomb filter according to the present invention. FIG. 2 is a plan view showing an inflow end face of the honeycomb filter shown in FIG. 1. FIG. 3 is a plan view showing the outflow end face of the honeycomb filter shown in FIG. 1. FIG. 4 is a cross-sectional view schematically showing an A-A' cross section of FIG. 2.

As shown in FIGS. 1 to 4, the honeycomb filter 100 includes a honeycomb substrate 4, an outer peripheral coating layer 3 disposed so as to surround the outer periphery of the honeycomb substrate 4, and plugging portions 5. The honeycomb substrate 4 includes porous partition walls 1 arranged to surround a plurality of cells 2 each of which is a fluid channel extending from an inflow end face 11 to an outflow end face 12. The honeycomb substrate 4 is a pillar-shaped body having, as both end faces thereof, the inflow end face 11 and the outflow end face 12 in which the above-described partition walls 1 is arranged in a grid pattern. The outer peripheral coat layer 3 is a circumferential wall disposed so as to surround the outer periphery of the honeycomb substrate 4. The outer peripheral coating layer 3 is a porous layer obtained by applying an outer peripheral coating material to the outer peripheral surface of the honeycomb substrate 4 and drying and firing the applied outer peripheral coating material.

The plugging portions 5 are disposed at any one of ends on the inflow end face 11 and ends on the outflow end face 12, of the cells 2 to plug open ends of the cells 2. The plugging portions 5 are porous and made of a porous material (that is, a porous body). In the honeycomb filters 100 shown in FIGS. 1 to 4, the predetermined cells 2 in which the plugging portions 5 are disposed at the ends on the inflow end face 11 and the remaining cells 2 in which plugging portions 5 are disposed at the ends on the outflow end face 12 are alternately disposed with the partition walls 1 interposed therebetween. Hereinafter the cells 2 having the plugging portions 5 at the ends on the inflow end face 11 may be called "outflow cells 2b". The cells 2 having the plugging portions 5 at the ends of the outflow end face 12 may be called "inflow cells 2a".

The honeycomb filter 100 has particularly major properties in a configuration of the outer peripheral coating layer 3 disposed so as to surround the outer periphery of the honeycomb substrate 4. Hereinafter, the outer peripheral coating layer 3 will be described in more detail.

The outer peripheral coating layer 3 has an inflection point at which expansion in thermal expansion behavior thereof turns to contraction and a temperature T1 of which is 1000 to 1500° C. Such a configuration of the outer peripheral coating layer 3 makes it possible to suppress damage of the honeycomb filter 100 caused by an increase of an exhaust gas temperature and make the honeycomb filter 100 excellent in thermal shock resistance. When the temperature T1 of the inflection point is less than 1000° C., the honeycomb filter 100 may be damaged due to a difference of expansion and contraction between the honeycomb substrate 4 and the outer peripheral coating layer 3. Further, when the above-described temperature T1 of the inflection point exceeds 1500° C., an expansion difference between the honeycomb substrate 4 and the outer peripheral coating layer 3 is widened to generate high stress, so that the honeycomb filter 100 may be damaged. Although not particularly limited, the temperature T1 of the inflection point is preferably 1050 to 1400° C., and more preferably 1100 to 1200° C.

The thermal expansion behavior of the outer peripheral coating 3 and the temperature T1 of the inflection point at which expansion thereof turns to contraction can be measured by the following methods. First, using a differential detection-type thermal dilatometer, the average thermal expansion coefficient of the outer peripheral coating layer 3 in each temperature range is measured at a temperature increase rate of 10° C./min, and the thermal expansion behavior associated with the dimensional change of the measured sample is measured. The measurement by the thermal dilatometer is started at 40° C., and the measurement up to 1500° C. is performed at the above-described heating rate. When a point (temperature) at which the thermal expansion behavior starts to decrease is confirmed in the measurement from 40° C. to 1500° C., the temperature is defined as the "temperature T1 of the inflection point at which the expansion turns to contraction". On the other hand, when it is not possible to confirm that the thermal expansion behavior starts to decrease in the measurement from 40° C. to 1500° C., the temperature T1 of the inflection point is set to be greater than 1500° C. The thermal behavior can be measured using a bulk-body sample prepared by solidifying the outer peripheral coating material used for preparing the outer peripheral coating layer 3. In a case where a sample for measurement can be produced from the outer peripheral coating layer 3, measurement may be performed using a sample cut out from the outer peripheral coating layer 3.

Further, in the honeycomb filter 100 of the present embodiment, the outer peripheral coating layer 3 has a porosity P1 of 36 to 48%, and a thermal expansion coefficient C1 between 40 to 800° C. of 2.5 to $3.5 \times 10^{-6}$/° C. For example, when the porosity P1 of the outer peripheral coating layer 3 is 36 to 48%, the porosity of the outer peripheral coating layer 3 can be increased so that the heat capacity of the entire is lowered. Therefore, when the catalyst is loaded in the honeycomb filter 100, the rate of temperature rise of the catalyst is improved, and purification performance is expected to be improved due to early activation of the catalyst. In addition, it is preferable from the viewpoint of thermal shock resistance that the thermal expansion coefficient C1 between 40° C. and 800° C. of the outer peripheral coating layer 3 is 2.5 to $3.5 \times 10^{-6}$/° C. In the present description, the "thermal expansion coefficient" means the average thermal expansion coefficient measured using the differentially detected thermal dilatometer.

Porosity P1 of the outer peripheral coating layer 3 may be 36 to 48%, for example, preferably 37 to 48%, and more preferably 38 to 48%. Thermal expansion coefficient C1 between 40° C. and 800° C. of the outer peripheral coating layer 3 may be 2.5 to $3.5 \times 10^{-6}$/° C., for example, preferably 2.5 to $3.3 \times 10^{-6}$/° C., more preferably 2.5 to $3.0 \times 10^{-6}$/° C.

The porosity P1 of the outer peripheral coating 3 can be measured by the following methods. The porosity of the outer peripheral coating layer 3 can be calculated from an area ratio obtained by binarizing scanning electron-microscope (SEM). images of a cross section obtained by cutting out the outer peripheral coating layer 3 and taking an image thereof by a SEM.

The thermal expansion coefficient C1 of the outer coating layer 3 between 4° and 800° C. can be measured by the following methods. The thermal expansion coefficient C1 is calculated by measuring an average thermal expansion coefficient in each temperature-range using a differential detection-type thermal dilatometer. Here, the heating rate is 10° C./min. In measuring the thermal expansion coefficient C1 between 40° C. and 800° C. of the outer peripheral coating layer 3, the average thermal expansion coefficient in in each temperature-range is measured using a bulk-body sample prepared by solidifying the outer peripheral coating material used for preparing the outer peripheral coating layer 3. In a case where a sample for measurement can be produced from the outer peripheral coating layer 3, measurement may be carried out using a sample produced by cutting out from the outer peripheral coating layer 3.

Although not particularly limited, a surface roughness Ra of the outer peripheral coating layer 3 is preferably 10 to 25 μm, and more preferably 13 to 25 μm. For example, when the honeycomb filter 100 is used as a filter for purifying exhaust gas, it may be used while being stored in a can body such as a metallic case. Holding the honeycomb filter 100 in a can body such as a metallic case is sometimes referred to as canning. When the honeycomb filter 100 is canned, a surface pressure is applied to the outer peripheral surface of the honeycomb filter 100 via a holding member such as a mat, and is held in the can body. When the surface roughness Ra of the outer peripheral coating layer 3 is 10 to 25 μm, holding property by canning can be improved, and the isostatic strength of the honeycomb filter 100 can be improved.

The surface roughness Ra of the outer peripheral coating 3 is measured based on an arithmetic average roughness JIS B0601:2001. The surface roughness Ra of the outer peripheral coating layer 3 can be obtained by measuring surface roughness at five arbitrarily selected locations by the above-described measuring methods, and calculating the average thereof.

The thickness L1 of the outer peripheral coating layer 3 is not particularly limited. However, by setting the thickness L1 of the outer peripheral coating layer 3 to 1 to 3 mm, it is possible to further improve thermal shock resistance and isostatic strength. For example, when the thickness L1 of the outer peripheral coating layer 3 is less than 1 mm, isostatic strength of the honeycomb filter 100 tends to be lower than that of the honeycomb filter that satisfies the numerical value range of the thickness L1. Further, when the thickness L1 of the outer peripheral coating layer 3 exceeds 3 mm, heat capacity of the outer peripheral coating layer 3 is increased as compared with that of the honeycomb filter that satisfies the numerical value range of the thickness L1, and when the catalyst is loaded in the honeycomb filter 100, purification performance may not be sufficiently improved. The thickness of the outer peripheral coating 3 in the thickness L1 is preferably 1.5 to 2.5 mm, for example. The thickness L1 of the outer peripheral coating 3 can be measured using, for example, a scanning electron-microscope or a microscope. Incidentally, the thickness L1 of the outer peripheral coating layer 3 is defined as the average value of the measured values measured at eight measurement points as follows. First, eight positions every 45° in the circumferential direction of the end face of the honeycomb substrate 4 are determined as measurement points for measuring the thickness of the outer peripheral coating layer 3. Then, the thickness of the outer peripheral coating layer 3 is measured at each of the eight measurement points. The average value of the eight measured values is calculated, and the calculated average value is defined as the thickness L1 of the outer peripheral coating layer 3.

The outer peripheral coating layer 3 is formed of an outer peripheral coating material coated on an outer peripheral surface of the honeycomb substrate 4. As the outer peripheral coating material, a coating material containing cordierite particles, amorphous silica, and crystalline inorganic fibers can be suitably used. For example, the outer peripheral coating material can be prepared by adding water, various organic binders, and the like to the above-described raw materials. When the outer peripheral coating material is prepared, average particle diameters of cordierite particles and amorphous silicas and mixing ratios of the raw materials are controlled, whereby the outer peripheral coating layer 3 satisfying the properties described above can be obtained. The crystalline inorganic fibers are not particularly limited, and well-known ones can be used. As examples of the crystalline inorganic fibers, crystalline alumina silicate fibers, silicon carbide fibers or the like can be used. A single kind of crystalline inorganic fibers or a combination of a plurality of kinds of crystalline inorganic fibers may be used.

In the honeycomb filter 100, the configuration of the honeycomb substrate 4 having the porous partition walls 1 is not particularly limited. However, preferred embodiments of the honeycomb substrate 4 are as follows.

A porosity P2 of the honeycomb substrate 4 is preferably 53 to 60%, and more preferably 55 to 60%. The porosity P2 of the honeycomb substrate 4 is a value obtained by measuring a porosity of the partition walls 1 constituting the honeycomb substrate 4. The porosity P2 of the honeycomb substrate 4 is measured by the mercury-intrusion method. The porosity P2 of the honeycomb substrate 4 can be measured using, for example, Autopore 9500 (product name) manufactured by Micromeritics. The porosity P2 of the honeycomb substrate 4 can be measured by cutting out a portion of the partition walls 1 from the honeycomb substrate 4 to form a sample piece, and using the sample piece thus obtained. The porosity P2 of the honeycomb substrate 4 is preferably constant over the entire area of the honeycomb substrate 4.

A ratio (P1/P2) between the porosity P1 of the outer peripheral coating layer 3 and the porosity P2 of the honeycomb substrate 4 is preferably 0.6 to 0.9, and more preferably 0.6 to 0.85. Such a configuration having the ratio (P1/P2) makes it possible to obtain excellent advantages in canning property and thermal shock resistance.

In the honeycomb substrate 4, a thickness L2 of the partition walls 1 is preferably 0.17 to 0.32 mm, more preferably 0.17 to 0.29 mm. The thickness L2 of the partition walls 1 can be measured, for example, using a scanning electron-microscope or a microscope. If the thickness L2 of the partition walls 1 is less than 0.17 mm, satisfactory strength may not be obtained. On the other hand, when the thickness L2 of the partition walls 1 exceeds 0.32 mm, pressure loss of the honeycomb filter 100 may increase.

A thermal expansion coefficient C2 between 4° and 800° C. of the honeycomb substrate 4 is preferably 0.2 to 1.5× $10^{-6}/°$ C., more preferably 0.2 to 1.0× $10^{-6}/°$ C. The thermal expansion coefficient C2 between 4° and 800° C. of the honeycomb substrate 4 can be measured by the following methods. First, as a sample for measuring thermal expansion coefficient C2 of the honeycomb substrate 4, a sample piece having the following shapes is cut out from the honeycomb substrate 4. The sample piece has a rectangular parallelepiped shape in which a length thereof in an axial direction in which the cells 2 of the honeycomb substrate 4 extend is 50 mm and each length in each direction of a plane thereof perpendicular to the axial direction is 5 mm×5 mm. The thermal expansion coefficient C2 between 40° C. and 800° C. of the honeycomb substrate 4 is determined by measuring a thermal expansion coefficient in the axial direction of the sample piece thus prepared. The thermal expansion coefficient C2 is calculated by measuring each average thermal expansion coefficient in each temperature-range using a differential-detection thermal dilatometer. The measurement conditions are the same as the conditions for measuring the thermal expansion coefficient C1 of the outer peripheral coating 3.

A ratio (C1/C2) between the thermal expansion coefficient C1 of the outer peripheral coating layer 3 and the thermal expansion coefficient C2 of the honeycomb substrate 4 is preferably 3 to 12, and more preferably 4 to 10. Such a configuration having the ratio (C1/C2) makes it possible to obtain excellent advantages in thermal shock resistance.

Shapes of the cells 2 defined by the partition walls 1 are not limited especially. For example, the shapes of the cells 2 in the section that is orthogonal to the extending direction of the cells 2 may be polygonal, circular, elliptical or the like. Examples of the polygonal shape include a triangle, a quadrangle, a pentagon, a hexagon, and an octagon. The shapes of the cells 2 are preferably triangular, quadrangular, pentagonal, hexagonal or octagonal. Further, regarding the shapes of the cells 2, all the cells 2 may have the same shape or different shapes. For instance, although not shown, quadrangular cells and octagonal cells may be combined. Further, regarding sizes of the cells 2, all the cells 2 may have the same size or different sizes. For instance, although not shown, some of the plurality of cells may be larger, and the other cells may be relatively smaller. In the present invention, each of the cells means a space surrounded by the partition walls.

In the honeycomb substrate 4, a cell density of the cells 2 partitioned by the partition walls 1 is preferably 30 to 63 cells/cm², more preferably 31 to 62 cells/cm². The honeycomb filter 100 having this configuration can suppress increase in pressure loss while maintaining an ability thereof of trapping PM.

The shape of the honeycomb filter 100 is not particularly limited. The shape of the honeycomb filter 100 may include a pillar shape in which each shape of the inflow end face 11 and the outflow end face 12 is circular, oval, polygonal, or the like. The honeycomb substrate 4 may have a pillar shape and may further have a circumferential wall (not shown) on an outer peripheral side surface of the pillar shape which surrounds the partition walls 1 arranged in a grid pattern, or may not have such a circumferential wall. When the honeycomb substrate 4 has the circumferential wall, the outer peripheral coating layer 3 is disposed on the outer side of the circumferential wall. On the other hand, when the honeycomb substrate 4 does not have circumferential wall, the outer peripheral coating layer 3 is disposed on the outer peripheral surface of the honeycomb substrate 4 so as to surround outermost circumference part of the partition walls 1 arranged in a grid pattern.

The size of the honeycomb filter 100, for example, a length from the inflow end face 11 to the outflow end face 12, and a size of the cross section perpendicular to the extension of the cells 2 of the honeycomb filter 100 are not particularly limited. Each size may be appropriately selected such that the optimum purification performance is obtained when the honeycomb filter 100 is used as a filter for purifying exhaust gas.

Material of the partition walls 1 constituting the honeycomb substrate 4 are not particularly limited. For example, the material of the partition walls 1 preferably contain at least one selected from the group consisting of cordierite, silicon carbide, silicon-silicon carbide composite material, cordierite-silicon carbide composite material, silicon nitride, mullite, alumina, and aluminium titanate. In the honeycomb filter 100 of the present embodiment, as the material of the partition walls 1, a material containing at least one of cordierite, silicon carbide, and aluminium titanate can be exemplified as a preferable example.

The material of the plugging portions 5 is also not limited especially. For example, a material similar to the material of the partition walls 1 described above may be used.

(2) Manufacturing Method of the Honeycomb Filter

A method for manufacturing the honeycomb filter of the present invention is not limited especially, and the honeycomb filter can be manufactured by the following method, for example. First, a plastic kneaded material for producing a honeycomb substrate is prepared. A kneaded material for producing a honeycomb substrate can be prepared by adding an additive such as a binder, pore former, and water, as appropriate, to a material as a raw material powder selected from the above-mentioned partition walls suitable materials.

Next the prepared kneaded material in this way is extruded, thereby producing a pillar-shaped honeycomb formed body having partition walls defining a plurality of cells and a circumferential wall surrounding this partition walls. Next, the obtained honeycomb formed body is dried by microwaves and hot air, for example.

Next, plugging portions is provided at open ends of the cells of the dried honeycomb formed body. Specifically, a plugging material which includes a raw material to form the plugging portions is prepared first, for example. Next, a mask is applied to the inflow end face of the honeycomb formed body so as to cover the inflow cells. Next, the open ends of the outflow cells without the mask on the inflow end face of the honeycomb formed body is filled with the prepared plugging material. After that, the outflow end face of the honeycomb formed body also is filled with the plugging material at the open ends of the inflow cells similarly to the above.

Next, the honeycomb formed body in which plugging portions are disposed on one of open ends of the cells is fired to produce a plugged honeycomb fired body. Temperatures and atmosphere for the firing differ according to the raw material, and those skilled in the art can select the temperature and atmosphere for the firing that are the most suitable for the selected material.

Next, a circumferential wall of the obtained plugging honeycomb fired body is ground, and then an outer peripheral coating material is coated on the outer peripheral side of the partition walls to form an outer peripheral coating layer. In this way, the honeycomb filter can be manufactured. As the outer peripheral coating material, a coating material containing cordierite particles, amorphous silica, and crystalline inorganic fibers is preferably used. For example, the outer peripheral coating material can be prepared by adding water, various organic binders, and the like to the above-described raw materials. When the outer peripheral coating material is prepared, average particle diameters of the cordierite particles and amorphous silica and mixing ratios of the raw materials are controlled, whereby the outer peripheral coating layer satisfying the properties described above can be obtained.

EXAMPLES

The following will describe in more detail the present invention by examples, but the present invention is not at all limited by the examples.

Example 1

2 parts by mass of pore former, 2 parts by mass of dispersing medium, and 7 parts by mass of an organic binder were added to 100 parts by mass of cordierite forming raw material and mixed, and then kneaded to prepare a kneaded material. As the cordierite forming raw material, alumina, aluminum hydroxide, kaolin, talc, and silica were used. As the dispersing medium, water was used. As the organic binder, methylcellsulose was used. As the dispersing agent, dextrin was used. As the pore former, water absorptive polymer having the average particle diameter of 18 μm was used. In the present Example, the average particle diameter of the respective raw material is the particle size (D50) at an integrated value of 50% in the particle size distribution determined by the laser diffractometry and scattering method.

Next, the kneaded material was extruded using a die for manufacturing of a honeycomb formed body to obtain a honeycomb formed body having a round pillar shape as an overall shape. The cells of the honeycomb formed body were configured to be square.

Next, this honeycomb formed body was dried by a microwave dryer, and then was dried completely by a hot-air drier, and then both end faces of the honeycomb formed body were cut so as to have predetermined dimensions.

Next, a plugging material was prepared to form the plugging portions. Thereafter, a plugging material was used to form plugging portions on open ends of the predetermined cells on the inflow end face of the dried honeycomb formed body and on open ends of the remaining cells on the outflow end face.

Next, honeycomb formed body on which the respective plugging portions were formed were subjected to degreasing and fired to prepare a plugged honeycomb fired body. Next, a circumferential wall of the plugged honeycomb fired body was ground to prepare a plugged honeycomb substrate.

Next, an outer peripheral coating material was prepared by the following method. First, as the coating material raw material, cordierite particles, amorphous silicas, crystalline inorganic fibers, organic binders, and water were prepared. These were mixed and kneaded to prepare an outer peripheral coating material. The cordierite particles having an average particle diameter of 15 μm were used. Amorphous silicas having an average particle diameter of 300 μm were used. As the crystalline inorganic fibers, crystalline inorganic fibers having a fiber length of 52 μm were used. The mixture ratios of the cordierite particles, amorphous silica, and crystalline inorganic fibers were 25 parts by mass of the amorphous silica and 20 parts by mass of the crystalline inorganic fibers per 100 parts by mass of the cordierite particles.

Next, the outer peripheral coating material was applied on the outer peripheral surface of the plugged honeycomb substrate so as to have a predetermined thickness, and dried to form an outer peripheral coating layer. The drying method and drying conditions are not particularly limited, and may be appropriately adjusted. As described above, the honeycomb filter of Example 1 was manufactured.

The honeycomb filter of Example 1 had a round pillar shape where the inflow end face and the outflow end face were round. The inflow end face and the outflow end face had a diameter of 267 mm. Further, a length of the cells of the honeycomb filter in a direction in which the cells extended was 178 mm. In the honeycomb filter of Example 1, a thickness L2 of the partition walls was 0.25 mm, a porosity P2 of the partition walls constituting the honeycomb substrate was 53%, and a cell density was 47 cells/cm$^2$. Table 1 shows each of the results. The porosity of the partition walls was measured using Autopore 9500 (product name) produced by Micromeritics.

Further, in the outer peripheral coating layer disposed so as to surround the outer peripheral surface of the honeycomb substrate, a porosity P1 of the outer peripheral coating layer was 45%, the thickness L1 of the outer peripheral coating layer was 1.0 mm, the surface roughness Ra of the outer peripheral coating layer was 15 μm. The porosity P1 of the outer peripheral coating layer was obtained from the area ratio obtained by cutting out the outer peripheral coating layer and binarizing SEM images of the cross section thereof taken by a scanning electron-microscope (SEM). The surface roughness Ra of the outer peripheral coating layer was measured based on the arithmetic average roughness JIS B0601:2001.

A thermal expansion coefficient C1 of the outer peripheral coating layer and a thermal expansion coefficient C2 of the honeycomb substrate were measured by the following methods. Regarding the outer peripheral coating layer, a temperature T1 of an inflection point at which expansion in thermal expansion behavior of the outer peripheral coating layer turns to contraction was also measured.

[Thermal Expansion Coefficient C1 of the Peripheral Coating Layer and Thermal Expansion Coefficient C2 of the Honeycomb Substrate]

The thermal expansion coefficients C1 and C2 were calculated by measuring average thermal expansion coefficients in each temperature-range using a differential detection-type thermal dilatometer. Here, the heating rate was 10° C./min. In measuring the thermal expansion coefficient C1 between 40° C. and 800° C. of the outer peripheral coating layer, an average thermal expansion coefficient in each temperature-range is measured using a bulk-body sample prepared by solidifying the outer peripheral coating material used for preparing the outer peripheral coating layer. A sample for measuring the thermal expansion coefficient C2 of the honeycomb substrate was prepared by cutting out a sample piece having the following shape from the honeycomb substrate. The sample piece for measuring the thermal expansion coefficient C2 of the honeycomb substrate has a rectangular parallelepiped shape in which a length thereof in an axial direction in which the cells of the honeycomb substrate extend was 50 mm and each length in each direction of a plane thereof perpendicular to the axial direction is 5 mm×5 mm.

[Temperature T1 of the Inflection Point at which Expansion of the Outer Peripheral Coating Layer Turns to Contraction]

At a temperature increase rate of 10° C./min, an average thermal expansion coefficient of the outer peripheral coating layer in each temperature range and thermal expansion behavior due to dimensional changes of a measured sample were measured using a differential detection-type thermal dilatometer. The measurement by the thermal dilatometer is started at 40° C., and the measurement up to 1500° C. is performed at the above-described heating rate. When a point (temperature) at which the thermal expansion behavior starts to decrease is confirmed in the measurement from 40° C. to 1500° C., the temperature is defined as the "temperature T1 of the inflection point at which the expansion turns to contraction". On the other hand, when it is not possible to confirm that the expansion behavior starts to decrease in the measurement from 40° C. to 1500° C., the temperature T1 of the inflection point is set to be greater than 1500° C. The sample used for the measurement was the same as that used for the measurement of the thermal expansion coefficient C1 of the outer peripheral coating layer.

TABLE 1

| | Outer coat layer | | | | | Honeycomb substrate | | | |
|---|---|---|---|---|---|---|---|---|---|
| | Temperature T1 of inflection point at which expansion turns to contraction (° C.) | Thermal expansion coefficient C1 (×10⁻⁶/ ° C.) | Porosity P1 (%) | Surface roughness Ra (μm) | Thickness L1 (mm) | Porosity P2 (%) | Thickness L2 of partition walls (mm) | Cell density (cells/ cm²) | Thermal expansion coefficient C2 (×10⁻⁶/ ° C.) |
| Comparative Example 1 | 850 | 1.0 | 30 | 10 | 1.0 | 55 | 0.25 | 47 | 0.35 |
| Comparative Example 2 | 1100 | 2.5 | 32 | 15 | 1.0 | 61 | 0.25 | 47 | 0.30 |
| Comparative Example 3 | 850 | 1.0 | 30 | 10 | 0.5 | 55 | 0.25 | 47 | 0.35 |
| Comparative Example 4 | 850 | 1.0 | 35 | 10 | 1.0 | 55 | 0.25 | 47 | 0.35 |
| Comparative Example 5 | 850 | 1.0 | 30 | 10 | 4.0 | 55 | 0.25 | 47 | 0.35 |
| Example 1 | 1100 | 2.5 | 45 | 15 | 1.0 | 53 | 0.25 | 47 | 0.30 |
| Example 2 | 1100 | 2.5 | 48 | 18 | 3.0 | 60 | 0.25 | 47 | 0.35 |
| Example 3 | 1000 | 2.5 | 40 | 21 | 2.0 | 57 | 0.21 | 38 | 0.40 |
| Example 4 | 1100 | 3.0 | 48 | 25 | 1.0 | 56 | 0.17 | 33 | 0.30 |
| Example 5 | 1050 | 3.5 | 36 | 10 | 1.5 | 58 | 0.25 | 47 | 0.40 |
| Example 6 | 1200 | 2.5 | 45 | 13 | 2.0 | 60 | 0.19 | 62 | 0.25 |
| Example 7 | 1400 | 2.5 | 48 | 20 | 2.5 | 58 | 0.29 | 31 | 0.30 |

TABLE 2

| | Ratio of porosities (P1/P2) | Ratio of thermal expansions coefficients (C1/C2) | Thermal shock resistance Judgment | Purification performance Judgment | Isostatic strength Judgment |
|---|---|---|---|---|---|
| Comparative Example 1 | 0.55 | 2.9 | Standard | Standard | Standard |
| Comparative Example 2 | 0.56 | 8.3 | Failing | Good | Passing |

TABLE 2-continued

| | Ratio of porosities (P1/P2) | Ratio of thermal expansions coefficients (C1/C2) | Thermal shock resistance Judgment | Purification performance Judgment | Isostatic strength Judgment |
|---|---|---|---|---|---|
| Comparative Example 3 | 0.55 | 2.9 | Failing | Passing | Failing |
| Comparative Example 4 | 0.60 | 2.9 | Passing | Passing | Failing |
| Comparative Example 5 | 0.55 | 2.9 | Failing | Failing | Good |
| Example 1 | 0.87 | 8.3 | Excellent | Passing | Good |
| Example 2 | 0.80 | 7.1 | Passing | Passing | Excellent |
| Example 3 | 0.70 | 6.3 | Passing | Good | Excellent |
| Example 4 | 0.86 | 10.0 | Good | Excellent | Excellent |
| Example 5 | 0.62 | 8.8 | Passing | Passing | Passing |
| Example 6 | 0.75 | 10.0 | Passing | Good | Good |
| Example 7 | 0.83 | 8.3 | Excellent | Passing | Excellent |

The honeycomb filter of Example 1 was evaluated in view of "thermal shock resistance", "purification performance", and "isostatic strength" by the following methods. Table 2 shows the results.

[Thermal Shock Resistance]

First, an "ESP breakage temperature" of each honeycomb filter manufactured according to Examples and Comparative Examples was measured by the following method. The "ESP breakage temperature" is an index indicating thermal shock resistance. ESP is an abbreviation for Electric Furnace Spalling. Specifically, each honeycomb filter was put into an electric furnace heated to a certain predetermined temperature, and was taken out after a predetermined time to be examined whether breakage occurs in the outer peripheral coating layer. This operation was repeated while raising the temperature in the electric furnace in steps of 25° C., until breakage occurred in the outer peripheral coating layer, the temperature at which breakage occurred in the outer peripheral coating layer was measured. Thermal shock resistance was evaluated based on the temperature (hereinafter, referred to as a "breakage temperature") at which breakage occurred in the outer peripheral coat layer of each honeycomb filter of Examples and Comparative Examples, according to the following evaluation criteria. The breakage temperature was "Celsius temperature".

Evaluation "excellent": When the breakage temperature of the honeycomb filter of Comparative Example 1 is defined as 100% and the breakage temperature of the honeycomb filter to be evaluated is more than 110%, it is "excellent".

Evaluation "good": When the breakage temperature of the honeycomb filter of Comparative Example 1 is defined as 100% and the breakage temperature of the honeycomb filter to be evaluated is more than 105% and 110% or less, it is "good".

Evaluation "passing": When the breakage temperature of the honeycomb filter of Comparative Example 1 is defined as 100% and the breakage temperature of the honeycomb filter to be evaluated is more than 100% and 105% or less, it is "passing".

Evaluation "failing"; when the damage temperature of the honeycomb filter of Comparative Example 1 is defined as 100% and the breakage temperature of the honeycomb filter to be evaluated is 100% or less, it is "failing".

[Purification Performance]

First, test gas containing NOx was caused to flow into the honeycomb filter. Thereafter, NOx of the gas discharged from the honeycomb filter was analyzed by a gas analyzer.

The temperature of the test gas flowing into the honeycomb filter was 200° C. The temperature of the honeycomb filter and the test gas was adjusted by a heater. The heater was an infrared image furnace. As the test gas, a gas obtained by mixing 5% by volume of carbon dioxide, 14% by volume of oxygen, 350 ppm (by volume) of nitrogen monoxide, 350 ppm (by volume) of ammonia, and 10% by volume of water with nitrogen was used. In order to use the test gas, the water and a mixed gas obtained by mixing the other gases except the water were prepared separately, and the water and the mixed gas were mixed in a pipe when the test was performed. As the gas analyzer, "MEXA9100EGR (trade name) manufactured by HORIBA Corporation" was used. Further, the space velocity when the test gas flows into the honeycomb filter was set to 100,000 (time$^{-1}$). An NOx purification rate of the honeycomb filter was measured from NOx of the test gas and NOx of the gas discharged from the honeycomb filter. According to the NOx purification rate of each honeycomb filter of Examples and Comparative Examples, purification performance of each honeycomb filter was evaluated based on the following evaluation criteria.

Evaluation "excellent": When the NOx purification rate of the honeycomb filter of Comparative Example 1 is defined as 100% and the NOx purification rate of the honeycomb filter to be evaluated is more than 120%, it is "excellent".

Evaluation "good": When the NOx purification rate of the honeycomb filter of Comparative Example 1 is defined as 100% and the NOx purification rate of the honeycomb filter to be evaluated is more than 110% and 120% or less, it is "good".

Evaluation "passing": When the NOx purification rate of the honeycomb filter of Comparative Example 1 is defined as 100% and the NOx purification rate of the honeycomb filter to be evaluated is more than 100% and 110% or less, it is "passing".

Evaluation "failing": When the NOx purification rate of the honeycomb filter of Comparative Example 1 is defined as 100% and the NOx purification rate of the honeycomb filter to be evaluated is 100% or less, it is "failing".

[Isostatic Strength]

An isostatic strength was measured based on the isostatic fracture strength test specified in M505-87 of the automotive standard (JASO Standard) issued by Society of Automotive Engineers of Japan, Inc. The isostatic fracture strength test is a test in which a honeycomb filter is placed in a cylindrical container of rubber to be covered with a lid made of an aluminum plate, and is subjected to isotropic pressure compression in water. An isostatic strength measured by the isostatic fracture strength test is indicated by a value of the applied pressure (MPa) at which the honeycomb filter is broken. According to the isostatic strength of each honeycomb filter of Examples and Comparative Examples, the isostatic strength of each honeycomb filter was evaluated based on the following evaluation criteria.

Evaluation "excellent": When the isostatic strength of the honeycomb filter of Comparative Example 1 is defined as 100% and the isostatic strength of the honeycomb filter to be evaluated is more than 110%, it is "excellent".

Evaluation "good": When the isostatic strength of the honeycomb filter of Comparative Example 1 is defined as 100% and the isostatic strength of the honeycomb filter to be evaluated is more than 105% and 110% or less, it is "good".

Evaluation "passing": When the isostatic strength of the honeycomb filter of Comparative Example 1 is defined as 100% and the isostatic strength of the honeycomb filter to be evaluated is more than 100% and 105% or less, it is "passing".

Evaluation "failing"; when the isostatic strength of the honeycomb filter of Comparative Example 1 is defined as 100% and the isostatic strength of the honeycomb filter to be evaluated is 100% or less, it is "failing".

Examples 2 to 7

Honeycomb filters were manufactured in the same manner as the honeycomb filter of Example 1 except that the configuration of the honeycomb filter was changed as shown in Table 1. In Examples 2 to 7, average particle diameters and mixing ratios of the raw materials to be used were changed in the preparation of the outer peripheral coating material.

Comparative Examples 1 to 5

Honeycomb filters were manufactured in the same manner as the honeycomb filter of Example 1 except that the configuration of the honeycomb filter was changed as shown in Table 1. In Comparative Examples 1 and 3 to 5, the outer peripheral coating material was prepared as follows. The cordierite particles used for the outer peripheral coating material of Example 1 was changed to mixture containing cordierite particles having an average particle diameter of 15 μm and cordierite particles having an average particle diameter of 35 μm to prepare an outer peripheral coating material. Regarding the amount of cordierite particles used for preparing the outer peripheral coating material, when the amount of the cordierite particles used for the outer peripheral coating material of Example 1 was 100% by mass, the cordierite particles having an average particle diameter of 15 μm were set to 50% by mass, and the cordierite particles having an average particle diameter of 35 μm were set to 75% by mass.

The honeycomb filters of Example 2 to 7 and Comparative Examples 1 to 5 were also evaluated in view of "thermal shock resistance", "purification performance", and "isostatic strength" in the same manner as in Example 1. Table 2 shows the results.

(Results)

It was confirmed that the honeycomb filters of Example 1 to 7 exceeded the respective performances of the honeycomb filter of Comparative Example 1 as a standard in evaluating thermal shock resistance, purification performance, and isostatic strength.

In the honeycomb filter of Comparative Example 2, the porosity P1 of the outer peripheral coating layer was 32%, and thermal shock resistance was evaluated as "failing". In the honeycomb filters of Comparative Examples 3 and 5, the temperature T1 of the inflection point was 850° C., thermal expansion coefficient C1 of the outer peripheral coating layer was $1.0 \times 10^{-6}/°$ C., and thermal shock resistance was evaluated as "failing". In the honeycomb filter of Comparative Example 4, the porosity P1 of the outer peripheral coating layer was 35%, and the isostatic strength was evaluated as "failing".

INDUSTRIAL APPLICABILITY

The honeycomb filter of the present invention can be used as a filter to trap particulate matter in exhaust gas.

DESCRIPTION OF REFERENCE NUMERALS

1: partition wall, 2: cells, 2a: inflow cells, 2b: outflow cells, 3: outer peripheral coating layer, 4: honeycomb substrate, 5: plugging portions, 11: inflow end face, 12: outflow end face, 100: honeycomb filter.

What is claimed is:

1. A honeycomb filter comprising:
   a honeycomb substrate that is pillar-shaped and has porous partition walls disposed so as to surround a plurality of cells each of which serves as a fluid through channel extending from an inflow end face of the honeycomb substrate to an outflow end face of the honeycomb substrate,
   an outer peripheral coating layer disposed so as to surround an outer periphery of the honeycomb substrate, and
   plugging portions that are disposed at any one of ends on the inflow end face and ends on the outflow end face, of the plurality of cells, wherein,
   the outer peripheral coating layer has an inflection point at which expansion in thermal expansion behavior of the outer peripheral coating layer turns to contraction and a temperature T1 of which is 1000 to 1500° C.,
   the outer peripheral coating layer has a porosity P1 of 36 to 48%, and a thermal expansion coefficient C1 between 40 to 800° C. of 2.5 to $3.5 \times 10^{-6}/°$ C.,
   a surface roughness Ra of the outer peripheral coating layer is 10 to 25 μm, and a thermal expansion coefficient C2 between 4° and 800° C. of the honeycomb substrate is 0.2 to $1.5 \times 10^{-6}/°$ C.

2. The honeycomb filter according to claim 1, wherein a porosity P2 of the honeycomb substrate is 53 to 60%.

3. The honeycomb filter according to claim 1, wherein a ratio (P1/P2) between the porosity P1 of the outer peripheral coating layer and the porosity P2 of the honeycomb substrate is 0.6 to 0.9.

4. The honeycomb filter according to claim 1, wherein a thickness L1 of the outer peripheral coating layer is 1 to 3 mm.

5. The honeycomb filter according to claim 1, wherein a thickness L2 of the partition walls is 0.17 to 0.32 mm, and a cell density of the honeycomb substrate is 30 to 63 cells/cm².

6. The honeycomb filter according to claim 1, wherein a ratio (C1/C2) between the thermal expansion coefficient C1 of the outer peripheral coating layer and the thermal expansion coefficient C2 of the honeycomb substrate is 3 to 12.

* * * * *